United States Patent

Chiba

(10) Patent No.: US 9,484,165 B2
(45) Date of Patent: Nov. 1, 2016

(54) ILLUMINATION DISPLAY SWITCHING DEVICE

(71) Applicant: YAZAKI CORPORATION, Tokyo (JP)

(72) Inventor: Shingo Chiba, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 75 days.

(21) Appl. No.: 14/528,034

(22) Filed: Oct. 30, 2014

(65) Prior Publication Data

US 2015/0047958 A1 Feb. 19, 2015

Related U.S. Application Data

(63) Continuation of application No. PCT/JP2013/064419, filed on May 17, 2013.

(30) Foreign Application Priority Data

May 31, 2012 (JP) ................................. 2012-124248

(51) Int. Cl.
*H01H 9/18* (2006.01)
*H01H 13/02* (2006.01)
(Continued)

(52) U.S. Cl.
CPC ............ *H01H 13/023* (2013.01); *B29C 45/16* (2013.01); *B60K 37/06* (2013.01); *B60Q 3/004* (2013.01);
(Continued)

(58) Field of Classification Search
CPC ........ H01H 9/161; H01H 9/18; H01H 9/182; H01H 2009/183; H01H 13/023; H01H 13/83; H01H 2203/052
USPC .......................................................... 200/314
See application file for complete search history.

(56) References Cited

U.S. PATENT DOCUMENTS

| 4,163,883 A | * | 8/1979 | Boulanger | ............. | H01H 13/83 |
| | | | | | 200/314 |
| 4,293,764 A | * | 10/1981 | Amrhein | ................ | H02B 15/00 |
| | | | | | 200/314 |

(Continued)

FOREIGN PATENT DOCUMENTS

| CN | 101501800 A | 8/2009 |
| DE | 3924886 A1 | 1/1991 |

(Continued)

OTHER PUBLICATIONS

International Search Report and Written Opinion of the International Search Report for PCT/JP2013/064419 dated Aug. 16, 2013.

(Continued)

*Primary Examiner* — Felix O Figueroa
(74) *Attorney, Agent, or Firm* — Kenealy Vaidya LLP (57) ABSTRACT

An illumination display switching device includes a board, a push button-type switch mounted on the board, a light source mounted on the board, and a switch knob that is supported to a frame member to be slidable in an operation direction of the push button-type switch. The switch knob includes a display design part that is molded with a light-transmitting resin, a non-display design part except for the display design part that is molded with an opaque resin and a light guide member that is integrally molded with the light-transmitting resin of the display design part. The light guide member includes a base part and an arm part, and the base part is integrally molded with the display design part and the arm part extends from the base part and is connected to a switch part of the push button-type switch.

7 Claims, 7 Drawing Sheets

(51) Int. Cl.
*H01H 9/16* (2006.01)
*H01H 13/83* (2006.01)
*B29C 45/16* (2006.01)
*H01H 13/10* (2006.01)
*H01H 13/14* (2006.01)
*B60K 37/06* (2006.01)
*B60Q 3/00* (2006.01)
*B60Q 3/02* (2006.01)

(52) U.S. Cl.
CPC ............ *B60Q 3/0296* (2013.01); *H01H 9/161* (2013.01); *H01H 9/182* (2013.01); *H01H 13/10* (2013.01); *H01H 13/14* (2013.01); *H01H 13/83* (2013.01); *B60K 2350/2039* (2013.01); *H01H 2219/036* (2013.01); *H01H 2219/056* (2013.01); *H01H 2219/06* (2013.01); *H01H 2219/062* (2013.01); *H01H 2219/064* (2013.01); *H01H 2221/014* (2013.01); *H01H 2229/046* (2013.01); *H01H 2231/026* (2013.01)

(56) References Cited

U.S. PATENT DOCUMENTS

| | | | |
|---|---|---|---|
| 5,865,302 | A | 2/1999 | Suzuki et al. |
| 7,459,648 | B2 * | 12/2008 | Asai ............... H01H 13/023 200/310 |
| 2004/0227271 | A1 | 11/2004 | Takebe et al. |
| 2009/0322568 | A1 | 12/2009 | Yoshida |
| 2011/0036693 | A1 * | 2/2011 | Lin ................. H01H 13/023 200/314 |
| 2012/0000757 | A1 | 1/2012 | Ikeda |
| 2012/0307479 | A1 | 12/2012 | Toh |

FOREIGN PATENT DOCUMENTS

| | | |
|---|---|---|
| DE | 198 60 242 A1 | 3/2000 |
| DE | 20 2009 003 843 U1 | 6/2009 |
| DE | 20 2009 003 843 U1 | 9/2009 |
| EP | 2 104 125 A1 | 9/2009 |
| EP | 2 339 602 A1 | 6/2011 |
| GB | 2 311 658 A | 10/1997 |
| JP | 61-190627 U | 11/1986 |
| JP | 2000-173379 A | 6/2000 |
| JP | 2004-338183 A | 12/2004 |
| JP | 2007-220348 A | 8/2007 |
| JP | 2008-192407 A | 8/2008 |
| JP | 2011-198547 A | 10/2011 |
| JP | 2012-15014 A | 1/2012 |
| WO | 2011/102174 A1 | 8/2011 |

OTHER PUBLICATIONS

Japanese Office Action for the related Japanese Patent Application No. 2012-124248 dated Jan. 5, 2016.
Chinese Office Action for the related Chinese Patent Application No. 201380028976.3 dated Dec. 1, 2015.
Chinese Office Action for the related Chinese Patent Application No. 201380028976.3 dated May 25, 2016.

* cited by examiner

ILLUMINATION DISPLAY SWITCHING DEVICE

CROSS REFERENCE TO RELATED APPLICATIONS

This application is a continuation of PCT application No. PCT/JP2013/064419, which was filed on May 17, 2013 based on Japanese Patent Application No. 2012-124248 filed on May 31, 2012, the contents of which are incorporated herein by reference.

BACKGROUND OF THE INVENTION

1. Field of the Invention

The present invention relates to an illumination display switching device, and more particularly, to an illumination display switching device that improves visibility by illuminating from a backside a display design part such as letter, symbol or figure, which is formed on a switch knob for operating a push button-type switch.

2. Description of the Related Art

As an example of the illumination display switching device, an illumination display switching device is known which is used for an operation switch of an air conditioner device, an audio device and the like of a vehicle (refer to JP-A-2008-192407). That is, a switch knob that is supported to be slidable in an operation direction of the switch and a push bar that protrudes from a backside of the switch knob are integrally molded with a transparent resin material, a leading end of the push bar is formed with being contacted to an operation part of a push button-type switch and the switch knob is pushed to operate the push button-type switch. Also, in order to form a display part for identifying a type and the like of the switch such as letter, symbol, figure and the like on an operation surface of the switch knob, a part except for the display part is colored with a light-blocking paint so that only the display part is illuminated.

In particular, according to JP-A-2008-192407, the push button-type switch has a hollow cylindrical shape, a light emitting diode (LED) is accommodated in the cylinder to thus form a switch part on a cylindrical wall and an axis of the push bar operating the push button-type switch and molded with the transparent resin is matched with a center of the LED. Thereby, since a center of the operation of the switch knob and a central axis of the push button-type switch can be matched, a feeling (operation feeling) of the switch knob can be improved. Also, although a diameter of a part of the push bar, which is light-coupled to the LED, is small, a part that is connected to the display part of the switch knob is formed to have a cone-shaped enlarged part and an outer surface of the push bar is painted so as to suppress the internal light from leaking to the outside, thereby improving illumination performance of the display part.

As another example of the illumination display switching device, JP-A-2000-173379 discloses that a cylindrical switch knob, which is supported to a cylindrical attachment member to be slidable in an operation direction of a switch, is arranged above a push button-type switch and a light source. The switch knob has a disc-shaped upper part having a display part that is formed at an upper end of a hollow cylinder of the switch knob and is made of at least a light-transmitting material. A light-blocking member is provided at a part except for the display part of the switch knob, so that only the display part is illuminated to thereby improve the visibility. Meanwhile, the hollow cylinder of the switch knob is provided with a cylindrical light guide member inserted therein, which guides the light of the light source arranged just below the switch knob to the display part. Also, a lower end of the hollow cylinder of the switch knob is formed at a part thereof with a protruding push part that operates the push button-type switch. Also, a spring that pushes up and maintains the switch knob is provided to abut on the lower end of the hollow cylinder.

SUMMARY OF THE INVENTION

However, according to the illumination display switching device disclosed in JP-A-2008-192407, the push bar is integrally molded with the display part of the switch knob and the push bar adjacent to the display part has a cone shape and is thus thick. Therefore, since there is a large thickness difference between the display part and the push part, a so-called sink mark may occur at the display part corresponding to the thick push bar. Regarding this, since the switch knob disclosed in JP-A-2000-173379 also has the cylindrical part that is formed integrally with the disc-shaped display part, the resin is non-uniformly cooled upon molding, so that a sink mark may occur.

Also, the push bar that is a light guide member disclosed in JP-A-2008-192407 is enlarged into the cone shape from the light source towards the display part, thereby guiding the light over an entire area of the display part. However, the display design part that is formed in the display part is a letter, symbol or figure and it is not necessarily to illuminate the entire area. Therefore, the illuminance of the display design part that should be illuminated is lowered.

An object of the present invention is to prevent a sink mark from occurring at a display design part of a switch knob upon molding.

There is provided an illumination display switching device including: a board; a push button-type switch mounted on the board; a light source mounted on the board; and a switch knob that is supported to a frame member to be slidable in an operation direction of the push button-type switch, wherein the switch knob includes a display design part that is molded with a light-transmitting resin, a non-display design part except for the display design part that is molded with an opaque resin and a light guide member that is integrally molded with the light-transmitting resin of the display design part, wherein the display design part is illuminated from a backside by emission light of the light source through the light guide member, and the light guide member includes a base part and an arm part, wherein the base part is integrally molded with the display design part and the arm part extends from the base part and is connected to a switch part of the push button-type switch.

That is, according to the above configuration, since the display design part of the switch knob and the light guide member guiding the light to the display design part are integrally molded with the light-transmitting resin and the part except for the display design part of the switch knob is integrally molded with the opaque resin, i.e., since they are formed by a twice molding, it is possible to reduce a thickness difference, thereby suppressing a sink mark from occurring. That is, the non-display design part except for the display design part is thin and the display design part such as an illumination mark and a light guide member are thick. However, since they are divided and twice molded, a thickness difference thereof is small in each molding, so that it is possible to suppress a sink mark from occurring.

The illumination display switching device may be configured so that the light guide member is formed to match an axis of the arm part substantially with a center of an operation surface of the switch knob and an operation axis of the push button-type switch. Thereby, a reactive force that is caused when pushing an operation surface of the switch knob is applied from an exact opposite direction. Hence, it is possible to favorably make a switch operation feeling.

The illumination display switching device may be configured so that an inner surface of the arm part is formed with a cut surface which reflects and directs the emission light from the light source which is incident from a side surface of the arm part towards the display design part. That is, since an axis of the arm part of the light guide member is substantially matched with an operation axis of the push button-type switch, the light source is inevitably mounted on the board with a position thereof deviating from the push button-type switch. Therefore, emission light from the light source is irradiated to a space of the backside-side of the switch knob and is directly illuminated to the base part of the light guide member. Also, the emission light from the light source is incident from a side surface of the arm part of the light guide member, passes through the arm part and is then guided to the base part. Then, the light is guided from the base part to the display design part, thereby illuminating the display design part.

The illumination display switching device may be configured so that a branched part is formed to be integrally molded with the light guide member by the light-transmitting resin and branched from a side surface of the arm part and so that the emission light of the light source is guided to the arm part. Thereby, since the light illuminating the display design part is increased, it is possible to further improve the illuminance.

The illumination display switching device may be configured so that a crowned member that is crowned at a peripheral edge of the light emission surface of the light source is provided to surround an outer circumference of the light incident surface of the branched part. According to this configuration, since it is possible to guide most of the light, which is emitted from the light source, to the branched part and arm part, it is possible to further improve the illuminance of the display design part.

According to the present invention, it is possible to prevent a sink mark from occurring at the display design part of the switch knob upon molding.

DETAILED DESCRIPTION OF THE EXEMPLARY EMBODIMENTS

Hereinafter, an illumination display switching device of the present invention will be exemplified with reference to embodiments.
(First Embodiment)

Figure 2:
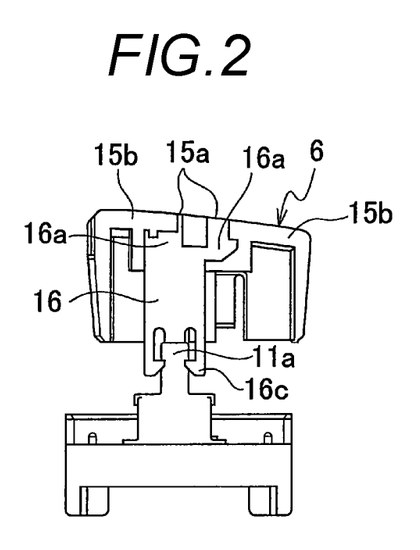
FIG. 2 is a cross-sectional view of the first embodiment, which is seen from an arrow II-II direction in FIG. 3.
Figure 3:
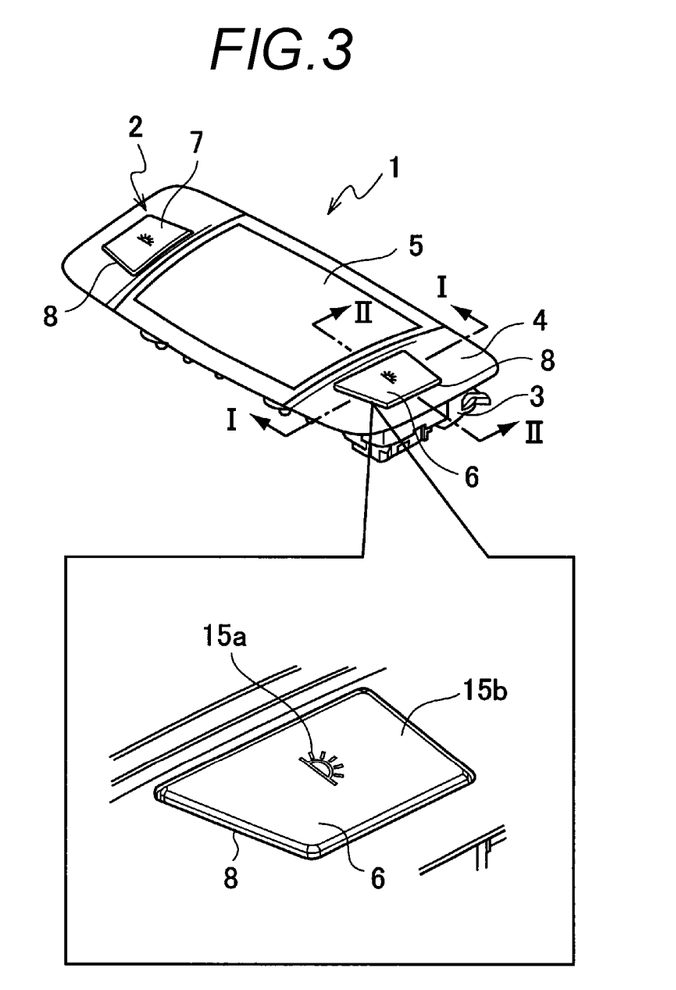
FIG. 3 is a perspective view of an example of an interior light to which the first embodiment is applied.

A first embodiment of the illumination display switching device of the present invention is described with reference to FIGS. 1 to 4. The first embodiment is applied to an illumination display switching device 2 of an interior light 1 shown in FIG. 3. However, the present invention is not limited thereto and can be applied to any illumination display switching device, irrespective of uses thereof, insomuch as it is an illumination display switching device that improves the visibility by illuminating from a backside a display design part such as letter, symbol or figure, which is formed on a switch knob operating a push button-type switch. In FIG. 3, the interior light 1 includes a bezel 4 having a backside on which a housing 3 accommodating therein illumination lights (for example, right and left illumination lights) (not shown) and a wiring board is attached, and a lens 5 that is mounted on a surface-side of the bezel 4. A left switch knob 6 and a right switch knob 7 of the illumination display switching device 2 are mounted in openings 8 formed on the bezel 4. Since the switch knob 6 and the switch knob 7 are symmetrically formed, this embodiment is described by taking the illumination display switching device 2 of the switch knob 6 as example.

Figure 1:
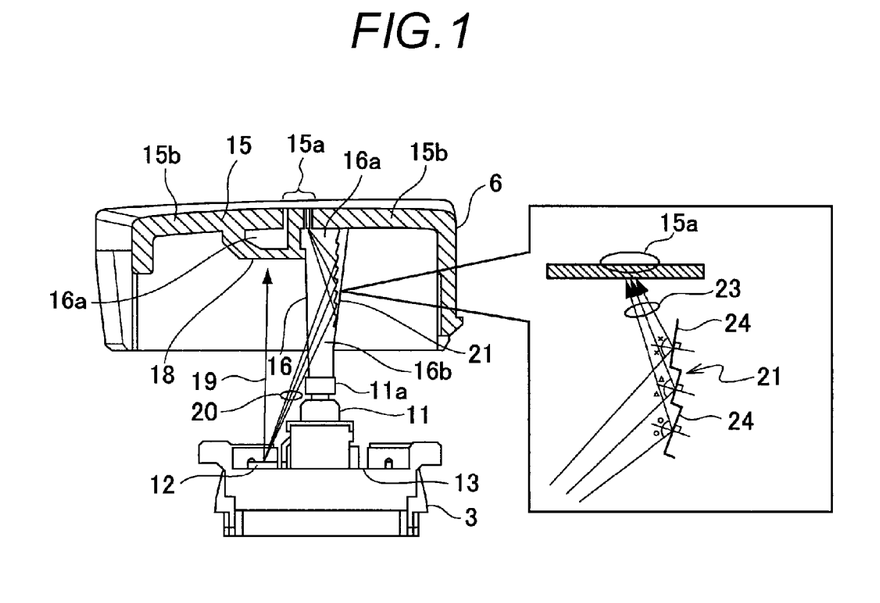
FIG. 1 is a cross-sectional view of a first embodiment of an illumination display switching device of the present invention, which is seen from an arrow I-I direction in FIG. 3.

As shown in FIG. 1, a board 13 having a push button-type switch 11 and a light source 12 mounted thereon is accommodated in the housing 3. In the meantime, FIG. 1 is a cross-sectional view seen from an arrow I-I direction of FIG. 3. In FIG. 1, the switch knob 6 having a cap shape is supported to the bezel 4 so that it can be slid in an operation direction (upper-lower direction in FIG. 1) of the push button-type switch 11, above the push button-type switch 11 and the light source 12. An operation surface part 15 to be pushed of the switch knob 6 is exposed to be flush with an outer surface of the bezel 4 and a display design part such as letter, symbol, or figure is formed on the operation surface part 15. In the first embodiment, the display design part is formed by an illumination mark 15a of a light-transmitting resin, as shown in FIG. 3. A non-display design part 15b except for the illumination mark 15a of the operation surface part 15 is molded with an opaque resin. Also, a backside of the illumination mark 15a is integrally molded with a base part 16a of a light guide member 16 guiding the light by a light-transmitting resin. The base part 16a is integrally molded with an arm part 16b of the light guide member 16 by a light-transmitting resin. As shown in FIG. 2, a leading end of the arm part 16b is formed with an engaging claw 16c that is engaged with a switch part 11a of the push button-type switch 11. Thereby, the arm part 16b is connected to the switch part 11a.

Figure 4:
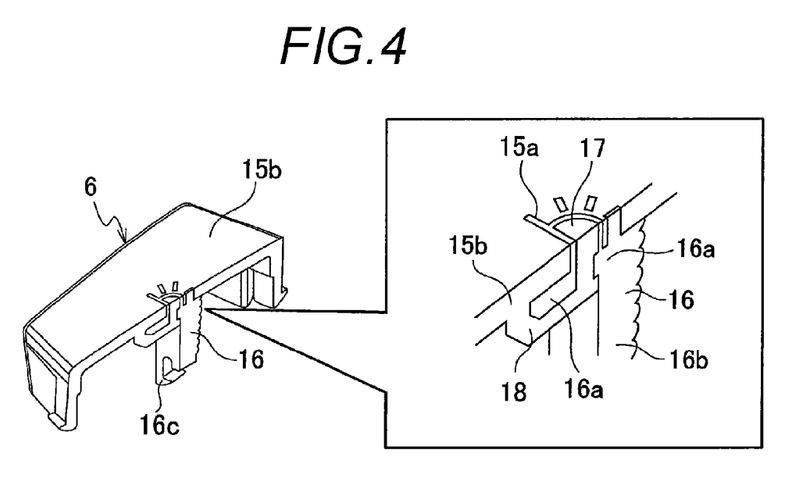
FIG. 4 is a perspective view showing a cut state of a switch knob of the first embodiment.

The switch knob 6 of this embodiment is formed by a twice molding in which the illumination mark 15a and the non-display design part 15b except for the illumination mark 15a are divided and formed using the light-transmitting resin and the opaque resin, i.e., by a so-called two-color molding. In case of the two-color molding, it may be necessary to mold a solitary island 17 in the non-display design part 15b by a shape and the like of the display design part, which is the illumination mark 15a, as shown in FIG. 4. In this case, as shown in FIG. 4, a bypass route with which the solitary island 17 and the non-display design part 15b, which are molded with the same opaque resin, communicate with each other is provided in a molding tool. Thereby, the opaque resin can be embedded in the solitary island 17, so that a bypass part 18 of the opaque resin is formed.

According to the first embodiment, since the illumination mark 15a that is the display design part of the switch knob 6 and the light guide member 16 guiding the light to the illumination mark 15a are integrally molded with the light-transmitting resin and the non-display design part 15b except for the illumination mark 15a of the switch knob 6 is integrally molded with the opaque resin, i.e., since they are formed by the twice molding, it is possible to reduce a thickness difference, thereby suppressing a sink mark from occurring. That is, the non-display design part 15b is thin and the illumination mark 15a and the light guide member 16 are thick. However, since they are divided and twice molded, a thickness difference thereof is small in each molding, so that it is possible to suppress a sink mark from occurring.

Also, in the first embodiment, an axis of the arm part 16b of the light guide member 16 is substantially matched with a center of the operation surface of the switch knob 6 and an operation axis of the push button-type switch 13. Thus, since a reactive force that is caused when pushing the operation surface part 15 of the switch knob 6 is applied from an exact opposite direction, it is possible to favorably make a switch operation feeling.

Also, according to the first embodiment, as shown in FIG. 1, an inner surface 21 of an opposite side of the arm part 16b is formed with a cut surface 24 so that light 23, which is formed as emission light 20 from the light source 12 is incident from a side surface of the arm part 16b of the light guide member 16 and is then reflected on the inner surface 21, is directed towards the illumination mark 15a that is the display design part. Thereby, emission light 19 from the light source 12 is irradiated to a space of the backside-side of the switch knob 6 and is directly illuminated to the base part 16a of the light guide member 16. Also, the emission light 20 from the light source 12 is incident from the side surface of the arm part 16b of the light guide member 16, passes through the arm part 16b and is then guided to the base part 16a and the reflected light 23 on the cut surface 24 is also guided to the base part 16a. Then, the light is guided from the base part 16a to the illumination mark 15a, so that the illumination mark 15a is illuminated. By doing so, according to this embodiment, it is possible to improve the illuminance of the illumination mark 15a. That is, since an axis of the arm part 16b of the light guide member 16 is substantially matched with an operation axis of the push button-type switch 13, the light source 12 is inevitably mounted on the board 13 with a position thereof deviating from the push button-type switch 13. However, according to this embodiment, the light that is guided to the illumination mark 15a is increased, so that the illuminance thereof can be further improved. In the meantime, the cut surface 24 is provided for each of minute sections, which are formed by axially dividing the inner surface of the arm part 16b. An angle of the cut surface 24 is set so that an angle between the emission light 20 of the light source 12 and the cut surface 24 is the same as an angle of a line connecting the cut surface 24 and the illumination mark 15a.

(Second Embodiment)

Figure 5A:
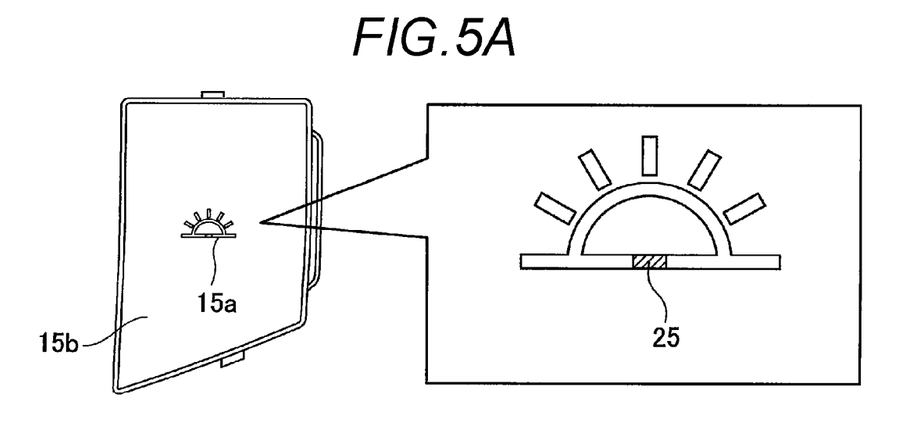
FIGS. 5A, 5B and 5C illustrate a characteristic part of a switch knob according to second and third embodiments of the illumination display switching device of the present invention.
Figure 5B:
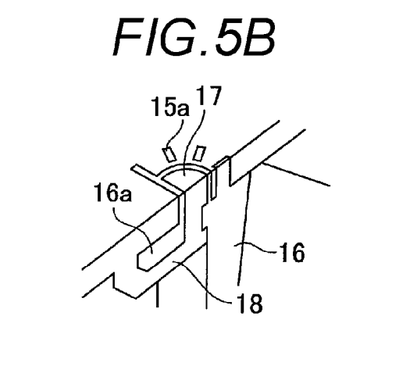
Figure 5C:
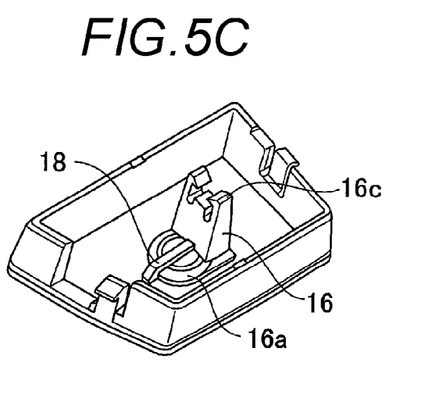
Figure 6A:
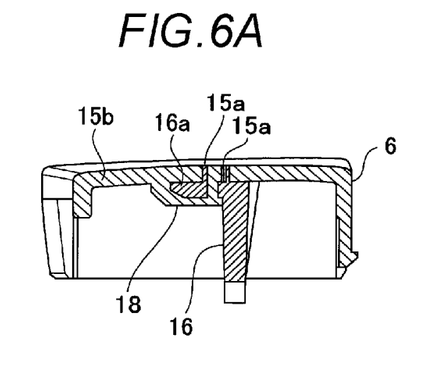
FIG. 6A is a cross-sectional view of the switch knob of the second embodiment.

A second embodiment of the illumination display switching device of the present invention is described with reference to FIGS. 5A to 5C and 6A. The second embodiment is different from the first embodiment, in that a problem, which is caused due to the bypass part 18 molded with the opaque resin in the first embodiment, is solved. That is, as shown in FIG. 5A, a part 25 of the illumination mark 15a becomes a shade of the light source 12 due to the bypass part 18, so that non-uniformity of the light occurs. In order to solve this problem, as shown in FIGS. 5B, 5C and 6A, a light-diffusing material is put in the light-transmitting resin. Thereby, the light of the base part 16a is scattered to the light guide member 16 becoming a shade of the bypass part 18, so that the non-uniformity of the light in the part 25 of the illumination mark 15a is not seen. That is, the illumination mark 15a is formed with a plurality of sections that is spaced, each section is integrally molded with the base part 16a of the light guide member 16 and an opaque resin is introduced to the solitary island 17 of the non-display design part 15b formed between the spaced sections. Therefore, a bypass route along which the opaque resin is introduced while bypassing the base part 16a is formed in a molding tool of the non-display design part 15b. By the bypass route, the bypass part 18 is formed, so that the part 25 of the illumination mark 15a becomes a shade of the light source 12 and the non-uniformity of the light is thus caused. To solve the problem, the light-diffusion material is mixed in the light-transmitting resin for molding the display design part 15a, so that the non-uniformity of the light can be made to be unseen.

(Third Embodiment)

Figure 6B:
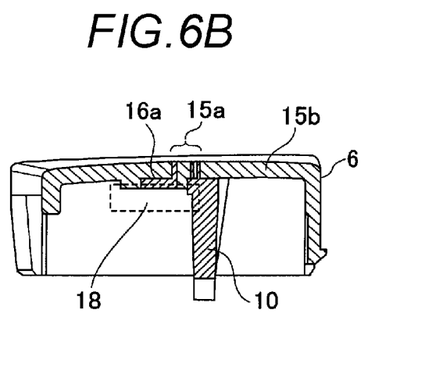
FIG. 6B is a cross-sectional view of the switch knob of the third embodiment.

A third embodiment of the illumination display switching device of the present invention is a modified embodiment of the second embodiment. In this embodiment, as shown in FIG. 6B, in order to remove the non-uniformity of light caused due to the bypass part 18, instead of the second embodiment, after completing the molding by the opaque resin, the bypass part 18 is cut and removed including a portion of the base part 16a. Thereby, it is possible to remove the non-uniformity of light in the part 25 of the illumination mark 15a.

(Fourth Embodiment)

Figure 7:
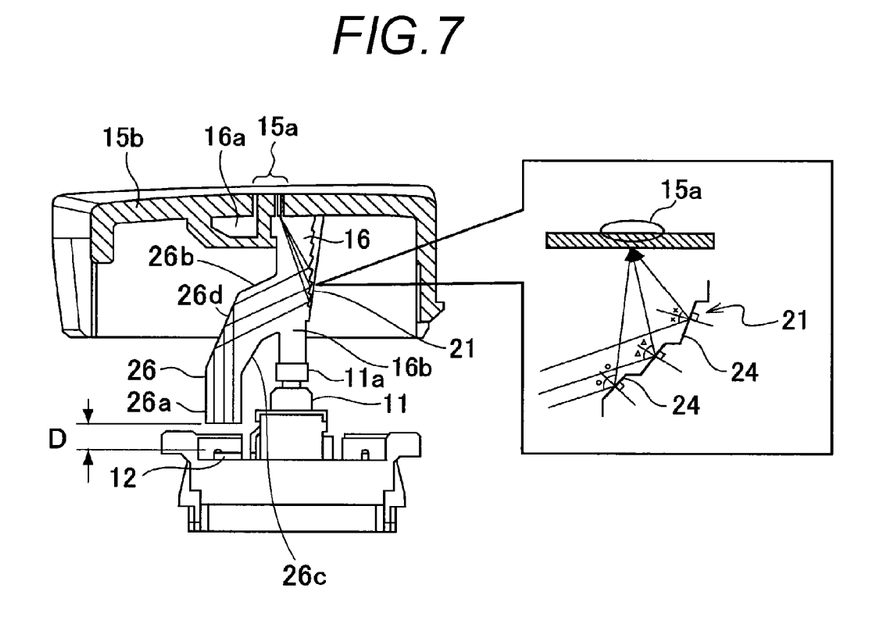
FIG. 7 is a cross-sectional view of a switch knob of a fourth embodiment of the illumination display switching device of the present invention.

A fourth embodiment of the illumination display switching device of the present invention is described with reference to FIG. 7. The fourth embodiment is different from the first embodiment, in that the light guide member 16 is provided with a branched part 26 that is branched from the arm part 16b. The branched part 26 is integrally molded with the light guide member 16 by the light-transmitting resin so that the emission light of the light source 12 is guided to the arm part 16b. A light incident surface of the branched part 26 is arranged to face a light emission surface of the light source with a preset interval D therebetween. The branched part 26 has a vertical portion 26a that stands up in a direction perpendicular to the light emission surface of the light source 12, a branched base portion 26b that extends obliquely downwards from a side surface of the arm part 16b and a connection portion 26c that connects the vertical portion 26a and the branched base portion 26b. An inner surface of the connection portion 26b facing the light source 12 is formed by an inclined surface 26d that is inclined towards the arm part 16b. The emission light from the light source 12 is reflected on the inclined surface 26d, so that it is reflected on the cut surfaces 24 formed on the inner surface of the opposite side of the arm part 16b and is then guided to the illumination mark 15a, as described in FIG. 1. In the meantime, a preset interval D is set to be larger than an operation range of the push button-type switch 11.

According to the fourth embodiment, since the light that is guided to the illumination mark 15a, which is the display design part, is increased, it is possible to further improve the illuminance. In the fourth embodiment, although not shown, a crowned member that is crowned at a peripheral edge of the light emission surface of the light source 12 may be provided to surround an outer circumference of the light incident surface of the vertical portion 26a facing the light source 12. According to this configuration, since it is possible to guide most of the light, which is emitted from the light source 12, to the illumination mark 15a through the branched part 26 and arm part 16b, it is possible to further improve the illuminance of the display design part. Also, the light incident surface of the vertical portion 26a facing the light source 12 may be formed to be concave so that the light emitted from the light source 12 is converged. According to this configuration, it is possible to thin the branched part 26 and arm part 16b of the light guide member 16.

According to the illumination display switching device, it is possible to prevent a sink mark from occurring at a display design part of the switch knob of the illumination display switching device upon molding.

What is claimed is:

1. An illumination display switching device comprising:
   a board;
   a push button-type switch mounted on the board;
   a light source mounted on the board; and
   a switch knob that is supported to a frame member to be slidable in an operation direction of the push button-type switch, wherein
   the switch knob includes a display design part that is molded with a light-transmitting resin, a non-display design part except for the display design part that is molded with an opaque resin and a light guide member that is integrally molded with the light-transmitting resin of the display design part, wherein the display design part is illuminated from a backside by emission light of the light source through the light guide member,
   the light guide member includes a base part and an arm part, wherein the base part is integrally molded with the display design part and the arm part extends from the base part and is connected to a switch part of the push button-type switch,
   the arm part includes a cut surface configured to reflect the emission light from the light source toward the display design part in a converging manner,
   the switch part of the push button-type switch includes a recess, and
   the light guide member includes an engaging claw that extends into the recess.

2. The illumination display switching device according to claim 1, wherein
   the light guide member is formed to match an axis of the arm part substantially with a center of an operation surface of the switch knob and an operation axis of the push button-type switch.

3. The illumination display switching device according to claim 2, wherein
   the cut surface is formed as an inner surface of the arm part and reflects and directs the emission light from the light source which is incident from a side surface of the arm part towards the display design part.

4. The illumination display switching device according to claim 1, wherein
   the display design part has a plurality of sections, the sections are spaced from each other and integrally molded with the base part of the light guide member,
   a solitary island of the non-display design part, which is formed between the plurality of spaced sections, is molded by a molding tool having a bypass route into which the opaque resin is introduced while bypassing the base part, and
   the light-transmitting resin forming the display design part is mixed with a light-diffusing material.

5. The illumination display switching device according to claim 1, wherein
   a branched part is formed to be integrally molded with the light guide member by the light-transmitting resin and branched from a side surface of the arm part and so that the emission light of the light source is guided to the arm part.

6. The illumination display switching device according to claim 1, wherein
   the switch knob further includes a bypass part that extends from the non-display design part and across the base part on a side of the base part that is opposite to the display design part.

7. The illumination display switching device according to claim 1, wherein
   the cut surface includes a plurality of cut surface sections located inside the arm part.

* * * * *